US011515805B2

(12) United States Patent
Gonthier

(10) Patent No.: US 11,515,805 B2
(45) Date of Patent: Nov. 29, 2022

(54) CAPACITOR DISCHARGE

(71) Applicant: STMicroelectronics LTD, Kowloon (HK)

(72) Inventor: Laurent Gonthier, Taipei (TW)

(73) Assignee: STMicroelectronics LTD, Kowloon (HK)

( * ) Notice: Subject to any disclaimer, the term of this patent is extended or adjusted under 35 U.S.C. 154(b) by 0 days.

(21) Appl. No.: 17/148,246

(22) Filed: Jan. 13, 2021

(65) Prior Publication Data

US 2021/0226553 A1 Jul. 22, 2021

(30) Foreign Application Priority Data

Jan. 21, 2020 (FR) .................................. 2000558

(51) Int. Cl.
| | | |
|---|---|---|
| *H02M 7/155* | (2006.01) | |
| *H02J 7/00* | (2006.01) | |
| *H02M 1/42* | (2007.01) | |
| *H02J 7/34* | (2006.01) | |

(52) U.S. Cl.
CPC .......... *H02M 7/155* (2013.01); *H02J 7/0063* (2013.01); *H02M 1/4208* (2013.01); *H02J 7/345* (2013.01)

(58) Field of Classification Search
CPC .... H02M 7/155; H02M 7/162; H02M 7/1623; H02M 7/17; H02M 1/4208; H02J 7/0063; H02J 7/345
See application file for complete search history.

(56) References Cited

U.S. PATENT DOCUMENTS

| | | |
|---|---|---|
| 4,014,309 A | 3/1977 | Nagasawa |
| 4,920,301 A | 4/1990 | Crooks |
| 5,402,058 A | 3/1995 | Larsen |
| 5,872,478 A | 2/1999 | Pounds |
| 6,424,125 B1 | 7/2002 | Graham |
| 8,953,347 B2 | 2/2015 | Jin et al. |
| 9,225,232 B2 | 12/2015 | Liu et al. |
| 9,263,939 B2 | 2/2016 | Jin et al. |
| 9,419,511 B2 | 8/2016 | Huang et al. |
| 9,455,621 B2 | 9/2016 | Lund et al. |

(Continued)

FOREIGN PATENT DOCUMENTS

| | | |
|---|---|---|
| EP | 2495854 A2 | 9/2012 |
| EP | 2509200 A1 | 10/2012 |

(Continued)

OTHER PUBLICATIONS

STMicroelectronics: "Inruch-current limiter circuits (ICL) with Triacs and Thyristors (SCR) and controlled bridge design tips". Mar. 31, 2016 (Mar. 31, 2016), XP055754586.

(Continued)

*Primary Examiner* — Nguyen Tran
(74) *Attorney, Agent, or Firm* — Crowe & Dunlevy

(57) ABSTRACT

A capacitive element has its terminals coupled together by two thyristors electrically in antiparallel. The discharge of the capacitive element is controlled by the application of a gate current to one thyristor of the two thyristors which is in a reverse-biased state in response to a voltage stored across the terminals of the capacitive element. The reverse-biased thyristor responds to the applied gate current by passing a leakage current to discharge the stored voltage.

31 Claims, 5 Drawing Sheets

(56) References Cited

U.S. PATENT DOCUMENTS

| | | |
|---|---|---|
| 9,787,211 B1 | 10/2017 | Schneider et al. |
| 9,871,394 B2 | 1/2018 | Ren et al. |
| 10,110,117 B2 | 10/2018 | Uemura et al. |
| 10,170,975 B1 | 1/2019 | Feng et al. |
| 10,483,874 B2 | 11/2019 | Benabdelaziz et al. |
| 2011/0025278 A1 | 2/2011 | Balakrishnan et al. |
| 2011/0068751 A1 | 3/2011 | Lin et al. |
| 2011/0101775 A1 | 5/2011 | Busch |
| 2012/0207505 A1 | 8/2012 | Kobayashi et al. |
| 2012/0230075 A1* | 9/2012 | Lee .................. H02M 1/36 363/128 |
| 2013/0027999 A1 | 1/2013 | Ptacek et al. |
| 2013/0049706 A1 | 2/2013 | Huang et al. |
| 2013/0076315 A1 | 3/2013 | Liu et al. |
| 2013/0188405 A1 | 7/2013 | Jin et al. |
| 2016/0373021 A1 | 12/2016 | Gonthier |
| 2017/0170746 A1 | 6/2017 | Benabdelaziz et al. |
| 2017/0187217 A1 | 6/2017 | Gong et al. |
| 2017/0302169 A1 | 10/2017 | Yamada |
| 2017/0346325 A1 | 11/2017 | Ohtake |
| 2019/0006959 A1 | 1/2019 | Benabdelaziz et al. |
| 2019/0222136 A1 | 7/2019 | Gonthier et al. |
| 2020/0403525 A1* | 12/2020 | Miyazaki .............. H02M 1/083 |

FOREIGN PATENT DOCUMENTS

| | | |
|---|---|---|
| EP | 2592738 A2 | 5/2013 |
| EP | 3096456 A1 | 11/2016 |
| FR | 3037741 A1 | 12/2016 |

OTHER PUBLICATIONS

INPI Search Report and Written Opinion for FR 2000558 dated Nov. 27, 2020 (11 pages).

Zhou, Liang et al: "99% Efficiency True-Bridgeless Totem-Pole PFC Based on GaN HEMTs," 2015, 9 pages.

* cited by examiner

CAPACITOR DISCHARGE

PRIORITY CLAIM

This application claims the priority benefit of French Application for Patent No. 2000558, filed on Jan. 21, 2020, the content of which is hereby incorporated by reference in its entirety to the maximum extent allowable by law.

TECHNICAL FIELD

The present disclosure generally concerns electronic devices and, in particular, electric power conversion electronic devices.

BACKGROUND

Electronic devices such as electric power converters are used to deliver a voltage and/or a current from a power supply having voltage/current values different from the voltage/current values to be delivered. In certain applications, DC or AC voltages are delivered by the converter from an AC voltage. In other applications, AC voltages are delivered by the converter from a DC voltage.

There is a need, when an electronic device is stopped, to discharge a capacitive element previously charged during the device operation, in particular in the case where an AC voltage is applied across the capacitive element during the device operation.

There is a need in the art to overcome all or part of the disadvantages of known circuits for discharging capacitive elements.

There is a need in the art to overcome all or part of the disadvantages of known capacitive element discharge methods.

SUMMARY

In an embodiment, a method to discharge a capacitive element having its terminals coupled together by two thyristors electrically in antiparallel comprises applying a gate current to a reverse-biased thyristor among said two thyristors.

According to an embodiment, for each of the two thyristors, a switch and the thyristor are electrically in series between the terminals of the capacitive element.

According to an embodiment, wherein, for each of the two thyristors, a diode and the thyristor are electrically in anti-series between the terminals of the capacitive element.

According to an embodiment, the method comprises, before said discharge, the application of an AC voltage between the terminals of the capacitive element, said discharge being caused by a detection of an absence of the AC voltage.

According to an embodiment, the method comprises, during a halfwave of the AC voltage, the setting to the on state of a forward-biased thyristor among the two thyristors.

According to an embodiment, said setting to the on state comprises the application of a gate current of same value as the gate current applied during said discharge.

An embodiment provides a circuit configured to implement the above defined method.

According to an embodiment, the circuit comprises a detector of the presence of a voltage to be discharged across the capacitive element and a control circuit coupled to said detector, the control circuit being configured to deliver, according to a signal delivered by the detector, the gate current applied during said discharge.

According to an embodiment, said detector comprises a detector of the sign of the voltage across the capacitive element, and said control circuit is configured so that the absence of an AC voltage is detected when said sign does not change for a given duration.

According to an embodiment, a same portion of the control circuit is used to perform said setting to the on state and to apply the gate current during said discharge.

According to an embodiment, the control circuit comprises a sequential data processing unit.

According to an embodiment, the circuit comprises a circuit for delivering, from the voltage across the capacitive element, an AC voltage common to said detector and to the control circuit and, preferably, one or a plurality of power supply voltages for controlling the two thyristors.

According to an embodiment: the two thyristors are anode-gate thyristors; the two thyristors have opposite gate types; or the two thyristors are cathode-gate thyristors.

An embodiment provides a power factor corrector comprising the above defined circuit.

An embodiment provides a converter comprising the above defined circuit or the above defined corrector.

BRIEF DESCRIPTION OF THE DRAWINGS

The foregoing and other features and advantages will be discussed in detail in the following non-limiting description of specific embodiments in connection with the accompanying drawings, in which.

DETAILED DESCRIPTION

Figure 1:
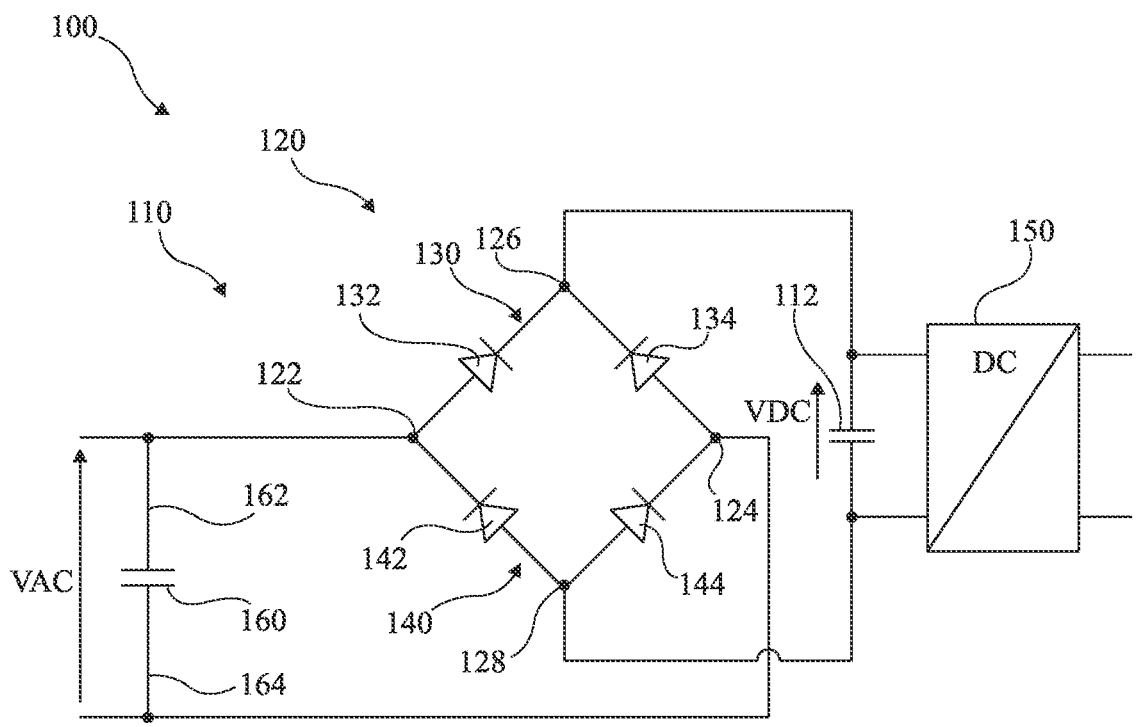
FIG. 1 shows an example of a converter to which the described embodiments apply.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, converter elements, such as conversion circuits receiving a DC voltage, and a data processing unit, are not described in detail, the described embodiments being compatible with such usual converter elements. Further, a method of controlling switches of a converter for converting and/or delivering an AC voltage into a DC voltage is not described in detail, the described embodiment being compatible with the methods implemented in usual converters. In particular, methods of control of switches of a power factor corrector receiving an AC voltage are not described in detail, the embodiments being compatible with such methods usually implemented in power factor correctors.

Throughout the present disclosure, the term "connected" is used to designate a direct electrical connection between circuit elements, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

FIG. 1 shows an example of a converter 100 to which the described embodiments apply.

Converter 100 comprises a circuit 110 forming a circuit of conversion of an AC voltage VAC into a DC voltage VDC. The DC voltage VDC is, for example, applied across a capacitive element 112 connected to the output of circuit 110. As an example, circuit 110 comprises a diode bridge 120, coupling nodes 122 and 124 of application of AC voltage VAC to nodes 126 and 128 of application of DC voltage VDC. Diode bridge 120 comprises branches 130 and 140 electrically in parallel between nodes 122 and 124.

Branch 130 comprises two diodes 132 and 134 coupled between nodes 122 and 124. Node 126 connects diodes 132 and 134 together. Diodes 132 and 134 have their cathodes facing node 126. Thus, diodes 132 and 134 are electrically in anti-series. Electronic components, such as diodes 132 and 134, are said to be electrically in anti-series when they are electrically in series and they have electrodes of same polarity, here, the cathodes of diodes 132 and 134, facing each other.

Branch 140 comprises two other diodes 142 and 144 coupled between nodes 122 and 124. Node 128 connects diodes 142 and 144 together. Diodes 142 and 144 have their anodes facing node 128, and are thus electrically in anti-series.

Converter 100 further comprises a conversion circuit 150 (DC) receiving DC voltage VDC. Circuit 150 converts DC voltage VDC into a voltage and/or a current. The voltage and/or the current delivered by circuit 150 may be DC or AC. Circuit 150 is typically of switched-mode type, that is, comprising one or a plurality of switches alternatively set to on and off states at a switching frequency, the switching frequency being greater than the frequency of the AC voltage. The switching frequency is, for example, more than 100 times, preferably more than 1,000 times, greater than that of AC voltage VAC. The described embodiments are compatible with usual switched-mode conversion circuits.

Converter 100 thus converts AC voltage VAC into a DC or AC voltage/current. The example of converter 100 described herein is not limiting. In other examples, one or a plurality of diodes 132, 134, 142, and 144 are replaced with switches such as transistors. Usual switch control methods enable to obtain the desired operation of converter 100. In still other examples, the converter delivers an AC voltage such as AC voltage VAC from a DC voltage.

Converters receiving an AC voltage and delivering a DC voltage, for example, for the charge of batteries of mobile devices such as laptop computers, cells phones, or also, for example, tablets, from an AC voltage source such as an electric power distribution network, are used. AC voltage VAC may then have a frequency equal to 50 Hz or 60 Hz, and a high peak value, that is, greater than 100 V, or even greater than 300 V. Other applications use a converter to drive lighting, such as light-emitting diode lighting, or to control an electric motor. In still other applications, the converter receives a DC current/voltage from a photovoltaic panel or an AC voltage from an alternator.

The power converted by the converter is typically a high power, that is, greater than approximately 30 W, for example, greater than 30 W, preferably greater than 70 W, and up to 50 kW.

In the case, not shown, where diodes 132, 134, 142, and 144 are replaced with switches, circuit 110 may further be configured to form a power factor correction PFC circuit. In other words, circuit 110 implements a usual switch control method enabling to perform a power factor correction. In this case, circuit 110 has the function of making the current that the converter consumes or delivers proportional, or substantially proportional, to AC voltage VAC. DC voltage VDC may then comprise a variable component, for example, having a peak amplitude smaller than 50%, preferably smaller than 20%, of an average value of DC voltage VDC. In the shown example, circuit 150 may also comprise a PFC.

The converter and PFC circuits of the above-described examples generally comprise a capacitive element 160. The AC voltage is applied across capacitive element 160. In other words, capacitive element 160 has a terminal 162 coupled, for example, connected, to node 122, and a terminal 164 coupled, for example, connected, to node 124. Capacitive element 160 is non-polar, that is, it is adapted so that the voltage thereacross successively takes the two opposite directions. This enables capacitive element 160 to receive AC voltage VAC. Capacitive element means that this element may be formed by a capacitor or by a plurality of capacitors in series and/or in parallel. Capacitive element 160 may comprise a bipolar capacitor, that is, be formed of polar capacitors arranged to form together a non-polar capacitive element.

Capacitive element 160 is typically comprised within an electromagnetic interference filter. Such a filter is typically provided to decrease the level of electromagnetic disturbances emitted by the converter.

However, at the end of the operation, when the converter is stopped by the stopping of the application of the AC voltage (for example, when the converter is disconnected), capacitive element 160 remains charged. It is then desired to discharge capacitive element 160. Indeed, the presence of a charge in the capacitive element would be a security and safety risk, particularly due to the high peak values of AC voltage VAC. It is typically desired to perform a discharge in accordance with the IEC 62368-1, IEC 60335, or, for example, IEC 60730 standards.

Figure 2:
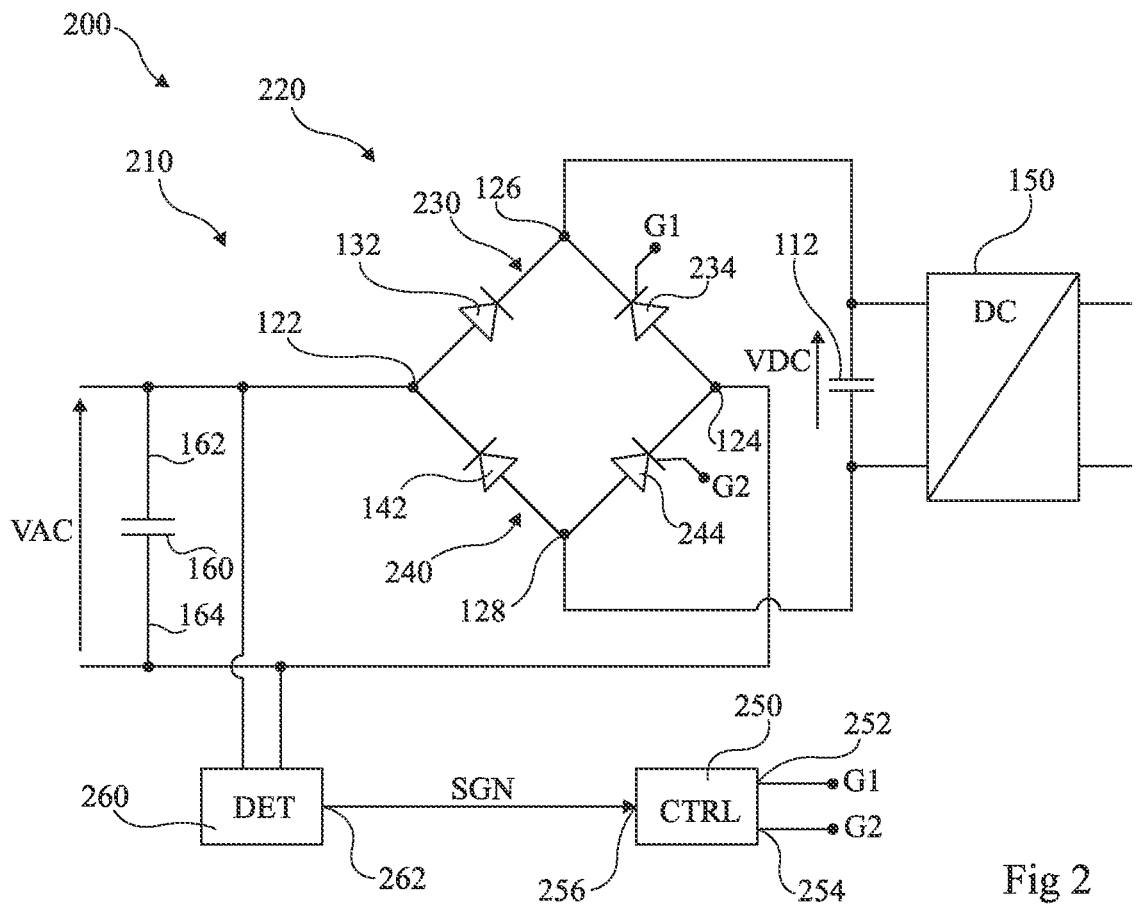
FIG. 2 schematically shows an embodiment of a converter.

FIG. 2 schematically shows an embodiment of a converter 200. Converter 200 comprises elements identical or similar to those of converter 100 of FIG. 1. These elements will not be described again herein. Only the differences are highlighted.

Converter 200 differs from the converter 100 of FIG. 1 in that diodes 134 and 144 have each been replaced with a thyristor, respectively 234 and 244. In other words, circuit 110 of the converter 100 of FIG. 1 is replaced, in converter 200, with a circuit 210 which differs from circuit 110 in that diode bridge 120 is replaced with a bridge 220 comprising thyristors 234 and 244. Thus, the branches 130 and 140 of the converter 100 of FIG. 1 are replaced with respective branches 230 and 240 comprising respective thyristors 234 and 244.

Thyristors 234 and are positioned in the same direction as the respective diodes 134 and 144 of FIG. 1, that is, thyristor 234 has its cathode facing node 126 and thyristor 244 has its anode facing node 128. Thus, thyristors 234 and 244 are electrically in antiparallel between terminals 162 and 164 of capacitive element 160. The term antiparallel between two terminals or nodes, concerning components such as thyristors, means that the components are electrically in parallel between the terminals or nodes and, for each of the terminals or nodes, the components have electrodes of different polarities facing the terminal or the node. In other words: the terminal 162 of capacitive element 160 is coupled, by diode 132 in the shown example, to the cathode of thyristor 234 and, by diode 142 in the shown example, to the anode of thyristor 244; and the terminal 164 of capacitive element 160 is coupled to the anode of thyristor 234 and to the cathode of thyristor 244.

Preferably, thyristors 234 and 244 are, as in the shown example, electrically in parallel between nodes 122 and 124 coupled to the respective terminals 162 and 164 of capacitive element 160.

According to the present embodiment, each of branches 230 and 240 comprises the respective diode 132, 142 electrically in anti-series with the respective thyristor 234, 244 of the branch. In other embodiments, diodes 132 and 142 may be replaced with switches such as transistors, as described hereafter in relation with FIG. 6.

Converter 200 further comprises a control circuit 250 (CTRL). Control circuit 250 has an output 252 coupled, for example connected, to a gate G1 of thyristor 234. Control circuit 250 has another output 254 coupled, preferably connected, to a gate G2 of thyristor 244.

Figure 3A:
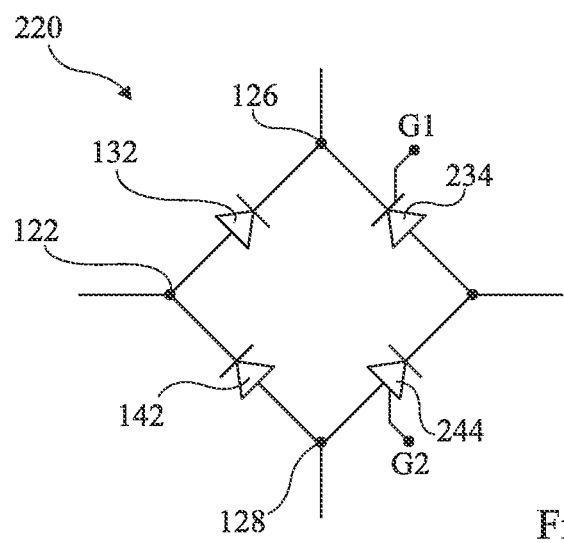
FIG. 3A schematically shows another example of a part of the converter of FIG. 2.
Figure 3B:
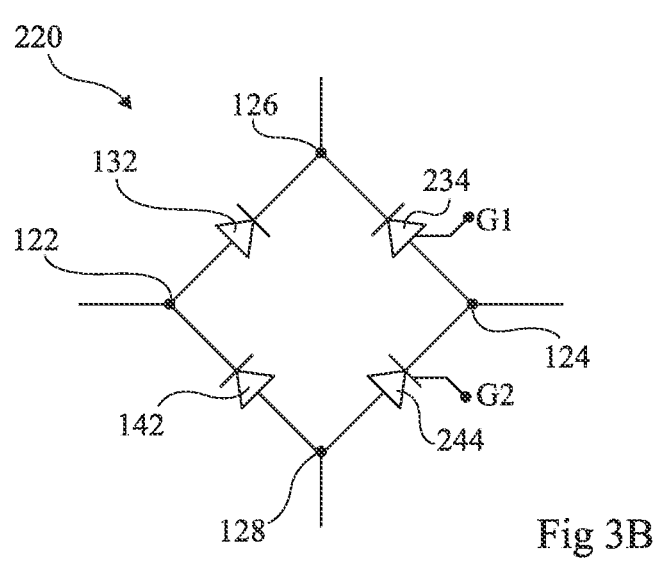
FIG. 3B schematically shows yet another example of a part of the converter of FIG. 2.
Figure 3C:
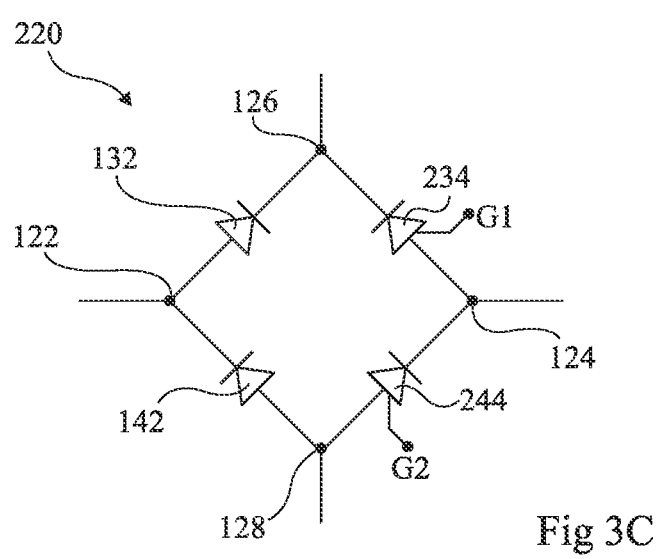
FIG. 3C schematically shows yet another example of a part of the converter of FIG. 2.

In the example shown in FIG. 2, the two thyristors 234 and 244 are cathode-gate thyristors. FIGS. 3A to 3C schematically show bridge 210 in other examples. In these examples, the anode/cathode gate types of thyristors 234 and/or 244 are different from that of the example of FIG. 2.

In the example of FIG. 3A, thyristor 234 is a cathode-gate thyristor, thyristor 244, is an anode-gate thyristor. In the example of FIG. 3B, thyristor 234 is an anode-gate thyristor, and thyristor 244 is a cathode-gate thyristor. Thus, in FIGS. 3A and 3B, one of the thyristors 234 and 244 is an anode-gate thyristor and the other one of the thyristors 234 and 244 is a cathode-gate thyristor, in other words, the thyristors have opposite gate types. In the example of FIG. 3C, both thyristors 234 and 244 are anode-gate thyristors. The selection of the type of each gate G1, G2 between an anode gate and a cathode gate is performed according to current sources available for delivering the gate currents to the thyristors 234 and 244, thus easing the application of the gate current.

Referring again to FIG. 2, converter 200 preferably comprises a detector 260 (DET) of the absence of an AC voltage between terminals 162 and 164 of capacitive element 160. Detector 260 has an output 262 coupled, preferably connected, to an input 256 of control circuit 250.

In an example, detector 260 comprises a detector of the sign of the voltage across capacitive element 160. The absence of a voltage is detected when the sign of the voltage does not change for a given duration longer than the duration of a halfwave of AC voltage VAC. Halfwave means a period during which AC voltage VAC has a constant sign. The sign detector may deliver to control circuit 250 a signal SGN, representative of the sign of the voltage across capacitive element 160. The detection of the absence of AC voltage VAC (which corresponds to an absence of sign change of the voltage between the terminals of capacitive element 260) may then be performed by control circuit 250 according to signal SGN.

This example is not limiting, and detector 260 may be formed by any circuit capable of detecting the presence or the absence of an AC voltage between terminals 162 and 164, in particular capable of making out AC voltages from DC voltages across capacitive element 160. The detector may also be formed by any circuit capable of sending to control circuit 250 a signal enabling to detect the absence of AC voltage VAC.

Figure 4:
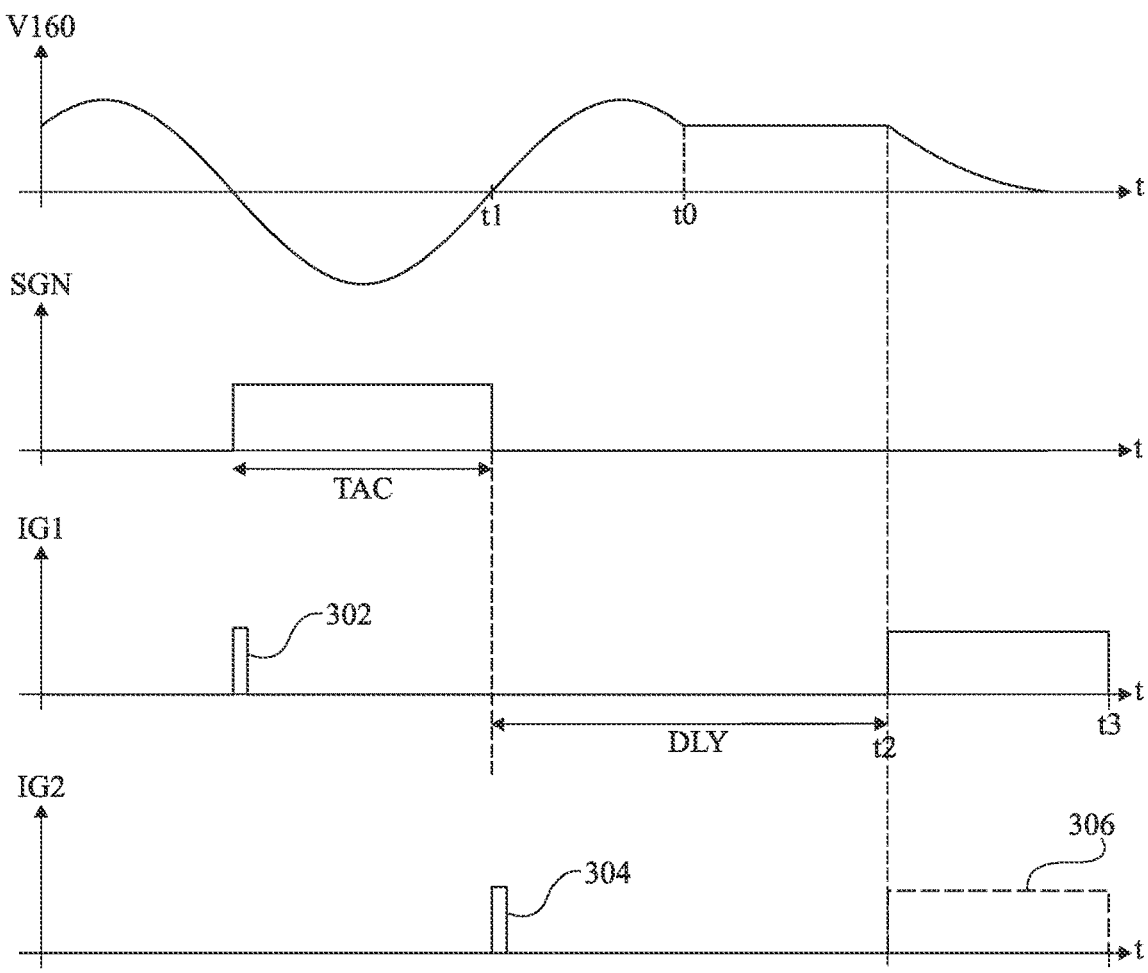
FIG. 4 shows, in simplified timing diagrams, an embodiment of a method implemented by a circuit of the converter of FIG. 2.

FIG. 4 shows in simplified timing diagrams an embodiment of a method implemented by step 210 of the converter of FIG. 2. More precisely, FIG. 4 shows, according to time t, curves: of a voltage V160 across capacitive element 160; of signal SGN representative of the sign of the voltage across capacitive element 160. For example, a low level of signal SGN represents a positive sign of voltage V160 (that is, the potential of terminal 162 is greater than that of terminal 164), and a high level of signal SGN represents a negative sign of voltage V160; currents IG2 and IG1 applied to respective gates G2 and G1. Each current IG2 and IG1 runs in the direction in which the current is capable of triggering the respective concerned thyristor 244, 234, that is, of turning on the thyristor. In other words, in the case where the concerned gate, respectively G1, G2, is a cathode gate, current IG1, IG2 preferably flows into the gate. In the opposite case where the concerned gate, respectively G1, G2, is an anode gate, current IG1, IG2 preferably flows out of the gate. The gate currents may have directions opposite to the above preferred directions, for example where the considered thyristor is comprised in a component such as a triac.

AC voltage VAC is applied across capacitive element 160 until a time t0. Until time t0, voltage V160 across capacitive element 160 is equal or approximately equal to AC voltage VAC (FIG. 2). Signal SGN then is a square pulse signal, where the square pulses have the duration (duration TAC) of a halfwave of positive sign of AC voltage VAC, or positive halfwave. The duration between square pulses, corresponding to that of negative halfwaves, is typically the same as duration TAC of the square pulses.

From time t0, AC voltage VAC is no longer applied to capacitive element 160. For example, the converter of the AC voltage source has been disconnected. This may be done manually by disconnecting a connection socket, or by opening a relay, not shown, located between the AC voltage source and the converter. In a variation, the detection circuit is omitted. The detection circuit may then be replaced with any device enabling to deliver a signal representative of the connected/disconnected state of the connection socket, or of the state of the relay.

In the shown example, time t0 occurs during a positive halfwave starting at a time t1. After time t0, capacitive element 160 first keeps the charge that it had at time t0. It is desired to discharge the capacitive element. In other words, the stopping of the application of the AC voltage corresponds to the presence of a DC voltage to be discharged across capacitive element 160. At a time t2, the lack of level change of signal SGN for a delay DLY after time t1 causes the detection of the absence of AC voltage VAC. In other words, the presence of a voltage to be discharged is detected at time t2. Delay DLY is longer than duration TAC of the halfwaves.

Control circuit 250 is configured to deliver gate current IG1 to thyristor 234 from time t2. Thyristor 234 is then reverse biased. The application of current IG1 to the gate of the reverse-biased thyristor enables to create a leakage current in the transistor, as described hereafter in relation with FIG. 5. The leakage current crosses the thyristor in the reverse direction, that is, flows through the thyristor from the cathode to the anode. This enables to discharge capacitive element 160. In the shown example, the current flows through diode 132. Indeed, due to the fact that diode 132 and thyristor 234 are in anti-series in branch 230, diode 132 is forward biased when thyristor 234 is reverse biased.

At a time t3, capacitive element 160 is discharged, or has a voltage below a predefined threshold, for example in the order of 60 V, or above 60 V. This threshold may be selected based on the capacitive value of capacitive element 160. Gate current IG1 is set to zero. In an example where control circuit 250 is powered from the energy contained in capacitive element 160, time t3 may be that at which the power supply of control circuit 250 is no longer sufficient to apply current IG1. The converter is thus off after time t3. Thus, circuit 210 plays the role of a discharge circuit for the capacitive element. Due to the fact that capacitive element 160 is discharged, the security of the persons manipulating the converter in the off state or coming into contact with conductors coupled to the converter in the off state is ensured.

In the case where time t0 occurs during a negative halfwave, thyristor 244 is reverse biased from time t0. From time t2 of detection of the absence of an AC voltage, current IG2 is applied to the gate of thyristor 244. The operation is then similar to that described hereabove. Thus, the fact of providing the two thyristors 234 and 244 electrically in antiparallel coupled to the terminals of the capacitive element enables, as compared with the provision of a single thyristor, to discharge the capacitive element whatever the direction of the voltage across the non-polar capacitive element 160.

In the case where each of thyristors 234 and 244 is in anti-series with diodes such as diodes 132 and 142, currents IG1 and IG2 may be applied simultaneously to the respective gates G1 and G2. This is shown in dotted lines 306. The discharge current runs through the thyristor which, among thyristors 234 and 244, is reverse biased. For the other one of thyristors 234 and 244, the diode in anti-series, respectively 132, 142, is in the non-conductive state and prevents any other discharge current. The operation of control circuit 250 to perform the discharge is then simpler than in the case where thyristors 234 and 244 are controlled differently.

To discharge a capacitive element, it could have been devised to connect a discharge resistor in parallel with the capacitive element. This would have resulted in a power loss in the resistor when the AC voltage is applied. As a comparison, the discharge device provided in converter 200 has the advantage of a better energy efficiency.

In an alternative embodiment, a discharge resistor, preferably in series with a switch, is provided in parallel with the capacitive element to be discharged. The switch is made non-conductive outside of the discharge, to avoid the loss of energy in the resistor or in the switch. As a comparison with this alternative embodiment, the fact of discharging capacitive element 160 only with the leakage current in the reverse-biased thyristor enables to limit the current without providing such a switch-resistor series association, in particular without adding a switch dedicated to the discharging. Indeed, the same thyristors may be used for obtaining DC voltage VDC from AC voltage VAC and for discharging the capacitive element. The discharge circuit 210 of the capacitive element is thus simplified, in particular for the high peak values of the AC voltage. Converter 200 is thus simpler than a converter comprising a circuit of discharge through a switch and a resistor in series.

It could also have been devised to discharge a capacitive element of a converter by using a transistor coupled in parallel with the capacitive element. Such a transistor could be coupled to the capacitive element by other components such as diode, switches and/or inductances, or connected in parallel with the capacitive element. The discharge could then be performed by setting the transistor to the saturated state, to limit the discharge current. The discharge could also be performed by setting the transistor alternately to on and off states at a switching frequency. As a comparison with such a discharge method, in converter 200, thyristors 234 and 244 are more robust than a transistor, in particular in case of voltage or current peaks, which provides a higher reliability of converter 200.

Thus, the capacitive element discharge method implemented by circuit 210 is simpler to implement and enables to obtain at the same time a high efficiency and a high reliability level.

Preferably, when AC voltage VAC is applied, that is, before time t0, thyristor 234 is set to the on state for each halfwave of negative sign of AC voltage VAC. This is obtained by application of a pulse 302 of current IG1 on gate IG1 at the beginning of the halfwave, for example, after the detection of the sign change of the AC voltage marking the beginning of the halfwave. The gate current direction during the pulse is the same as during the discharge phase. Similarly, thyristor 244 is set to the on state for each halfwave of positive sign of AC voltage VAC (pulse 304). Thus, at each halfwave, the thyristor which, among thyristors 234 and 244, is forward biased, is set to the on state. This enables to obtain, in the example of converter 200, an operation similar to that of the specific example of converter 100 of FIG. 1, with the difference that energy losses due to voltage drops in diodes 132 and 134 are avoided.

Preferably, each of currents IG1 and IG2 has the same value to set the respective thyristor 234, 244 to the on state during halfwaves of AC voltage VAC and when this current is applied during the discharge. As compared with variations where gate current IG1 and/or IG2 has different values in the presence of AC voltage VAC and during the discharge, the equal values enable to simplify the application of the control currents, and particularly enable to decrease the number and/or to simplify the control circuit.

The embodiments are not limited to the specific case of converter 200 of FIG. 2. Thus, alternative embodiments comprise the same elements as those of a converter of the type in FIG. 1, arranged identically or similarly, and further comprise a discharge circuit connected in parallel with the capacitive element 160 of the converter of FIG. 1. The discharge circuit is then formed by any circuit comprising two thyristors in antiparallel between the terminals of capacitive element 160, configured to discharge the capacitive element by applying a gate current to the reverse-biased thyristor. The discharge circuit is then for example used only to discharge capacitive element 160. The discharge circuit may be similar to the circuit 210 of the converter of FIG. 2. For example, the discharge circuit is not connected to a capacitive element such as element 112 and diodes 132 and 142 are replaced with direct connections.

However, as compared with such variations, circuit 210 of converter 200 of FIG. 2 has the advantage that the same thyristors 234 and 244 are used to supply DC voltage VDC and to discharge capacitive element 160. It is thus avoided to provide components exclusively dedicated to the discharge of the capacitive element. This results in a simplification of converter 200 and in an improvement of its reliability.

Figure 5:
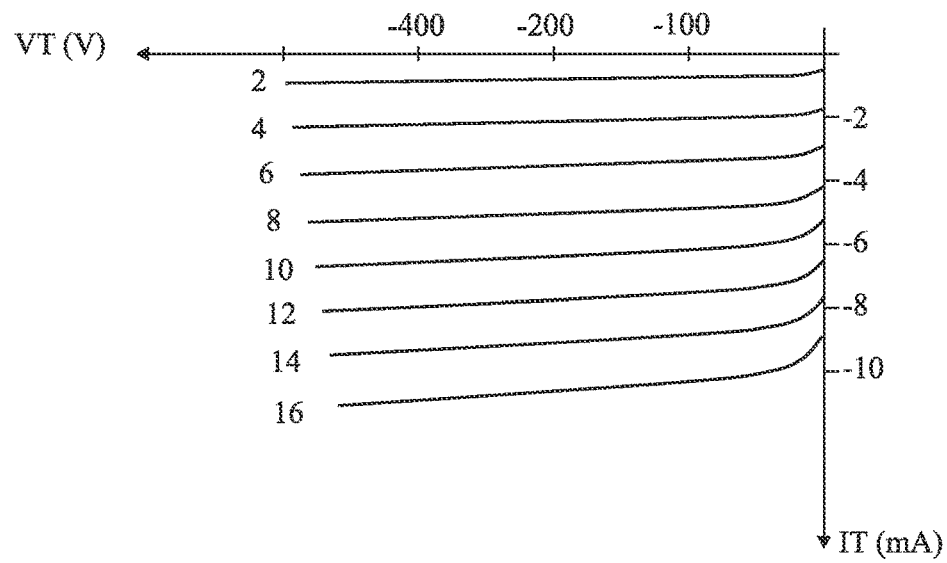
FIG. 5 schematically shows curves of a leakage current according to a gate current of a reverse-biased thyristor.

FIG. 5 schematically shows curves of leakage current IT in an example of a thyristor according to the thyristor reverse biasing voltage VT, for various values of the gate current applied to the thyristor. Current IT and voltage VT, being in the reverse direction, are shown in negative values. Current IT here is in milliamperes (mA, graduations −2, −4, −6, −8, and −10 on the axis of ordinates) and voltage VT here is in volts (V, graduations −100, −200, −400). The curves correspond to respective gate currents of 2, 4, 6, 8, 10, 12, 14, and 16 mA.

For each value of the gate current, current IT is substantially constant when voltage VT varies, in absolute value, between approximately 10 V and 500 V, or even more than 500 V. In other words, the reverse current approximately depends on the gate current only. Thus, the application of a predefined value of the gate current, independently from voltage value VT, enables to obtain an approximately constant discharge current. As compared with a discharge through a resistor element, this has the advantage, for a same discharge time, of decreasing a power peak dissipated at the beginning of the discharge.

Figure 6:
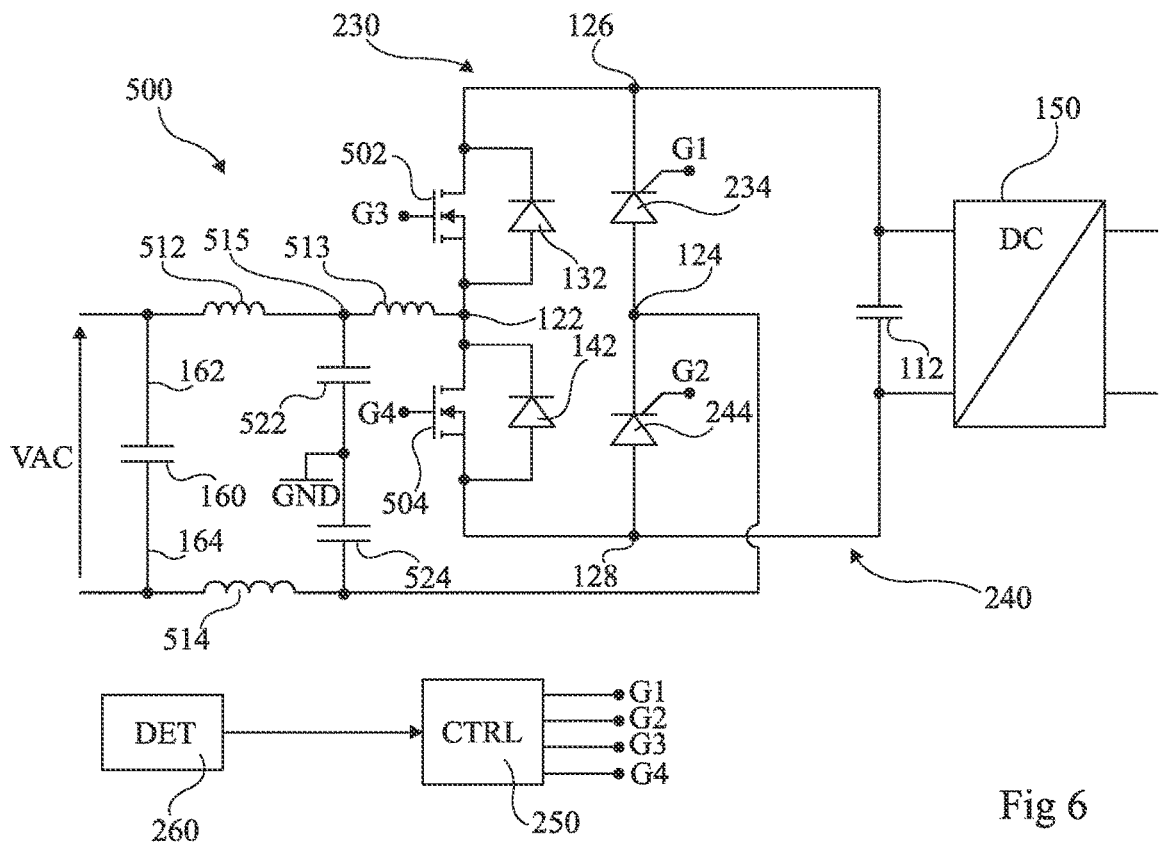
FIG. 6 schematically shows another embodiment of a converter.

FIG. 6 schematically shows another embodiment of a converter 500. Converter 500 comprises elements identical or similar to the elements of the converter 200 of FIG. 2, arranged in the same way or similarly. These elements are not described again. Only the differences are highlighted.

The converter 500 of FIG. 5 differs from the converter 200 of FIG. 2 in that diodes 132 and 142 comprise or are formed by junctions between internal doped semiconductor regions of transistors 502 and 504, of metal oxide semiconductor or MOS type. Although the MOS type used to originally designate transistors having a metal gate and an oxide gate insulator, the MOS type now is, due to the development of this type of transistor, understood as encompassing field-effect transistors having a gate made of any electric conductor, and having a gate insulator made of any dielectric or electric insulator. In the shown example, transistors 502 and 504 have an N channel. Diode 132, 142 then has its anode formed by the source of the respective transistor 502, 504 and its cathode formed by the drain of this transistor. Transistors 502 and 504 thus form switches in parallel with respective diodes 132 and 142. Thus, each of branches 230 and 240 comprises, in addition to the diode, respectively 132, 142, a switch in series with the thyristor, respectively 234, 244. Control circuit 250 (CTRL) then comprises outputs coupled, preferably connected, to the gates G3 and G4 of transistors 502 and 504.

Preferably, in converter 500, the coupling between terminal 162 of capacitive element 160 and node 122 comprises inductive elements 512 and 513 coupled in series by a node 515. Node 515 is coupled, by a capacitive element 522, to a node of application of a reference potential GND, for example, a ground. The coupling between terminal 164 of capacitive element 160 and node 124 may comprise an inductive element 514. Node 124 is then preferably coupled to node GND by a capacitive element 524. The value of inductive element 514 is adapted to perform a filtering without substantially modifying the above described operation. The inductive element 514 may be omitted.

In the presence of AC voltage VAC, circuit 210 operates to obtain, at the input of circuit 150, the desired DC voltage VDC and/or to obtain a desired power factor correction function.

To obtain the power factor correction, a method of controlling transistors 502 and 504 may typically be obtained from usual methods enabling to control the switches of a PFC of the type described in relation with FIG. 1 and comprising inductive elements such as elements 512, 513 and, optionally, 514. As compared with such a usual method, settings to the on state of thyristors 234 and 244 are added at the times when, in the usual method, respective diodes 134 and 144 are conductive.

To obtain a DC voltage VDC, a method of controlling transistors 502 and 504 may be obtained in a way similar to that described hereabove, from usual methods enabling to control the switches of a converter of the type in FIG. 1 where diodes 132 and 142, and/or 134 and 144, are replaced with switches.

After the stopping of the application of AC voltage VAC, the absence of an AC voltage is detected as described hereabove in relation with FIG. 4. Capacitive element 160 is then discharged, also in the way described in relation with FIG. 4.

The circuit 210 thus obtained then forms, according to the control method, a PFC and/or a circuit of conversion of AC voltage VAC into a DC voltage VDC. The advantages provided by thyristors 234 and 244 to discharge capacitive element 160 are similar to those described hereabove in relation with FIG. 4.

In the embodiment of FIG. 6, each of transistors 502 and 504 may be replaced, as a variation, with any parallel association of a switch and of the respective diode 132, 142.

Figure 7:
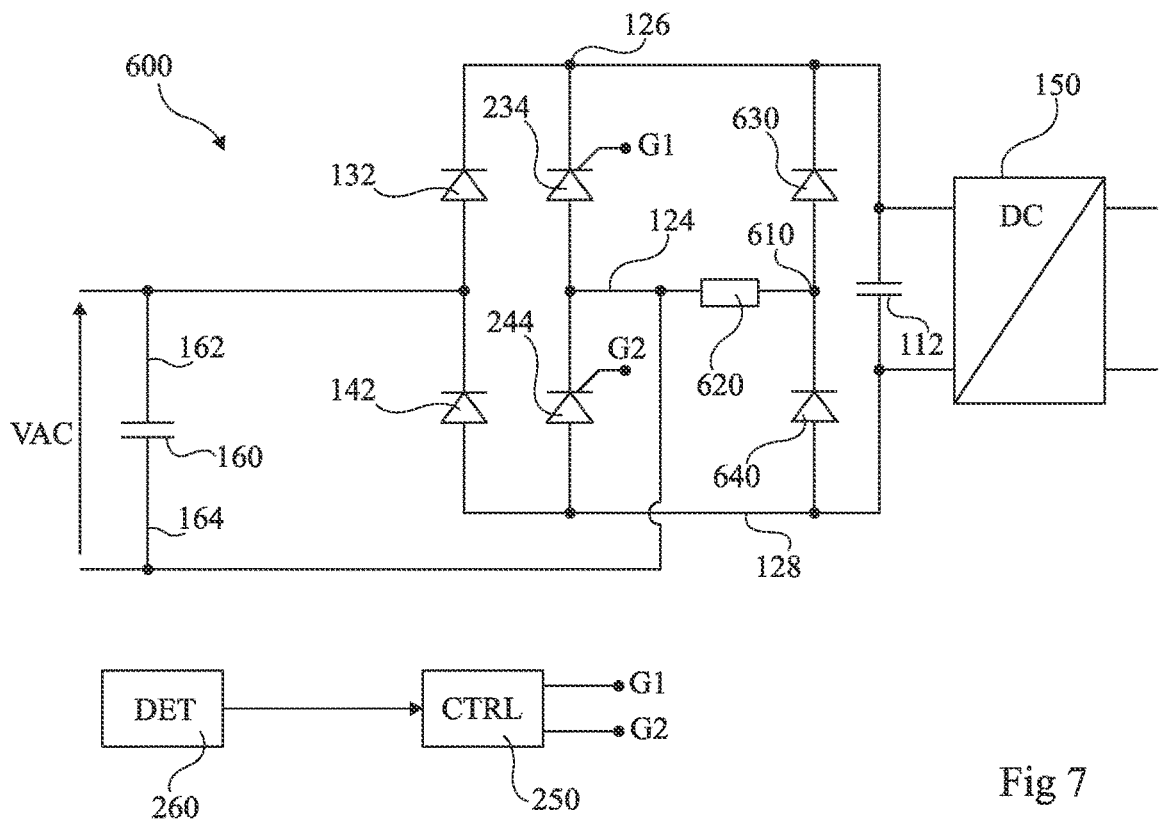
FIG. 7 schematically shows still another embodiment of a converter.

FIG. 7 schematically shows still another embodiment of a converter 600. This embodiment may be combined with that of FIG. 6, providing diodes 132 and 142 comprised in transistors 502 and 504 (FIG. 6) or in parallel of these transistors, and, preferably, providing elements 512, 513, and, optionally, 514 (FIG. 6). Converter 600 comprises elements identical or similar to the elements of the converter 200 of FIG. 2, arranged identically or similarly. These elements are not described again. Only the differences are highlighted.

Converter 600 comprises a node 610. Node 610 is coupled: to node 124 by a resistor 620, where resistor 620 may be made of any resistive element; to node 126 by a diode 630 having its anode facing node 610, and; to node 128 by a diode 640 having its anode facing node 128. Thus, diodes 630 and 640 are in series between nodes 126 and 128.

At the starting of converter 600, capacitive element 112 of application of DC voltage VDC is initially not charged. AC voltage VAC is applied. Thyristors 234 and 244 are maintained in the off state (non-conductive). Capacitive element 112 is charged through resistor 620 and through the diode bridge formed by diodes 132, 142, 630, and 640. Resistor 620 then enables to limit the initial charge current of capacitive element 112. It is thus avoided for a current peak to damage the converter or to decrease the reliability of the converter, or also to disturb the operation of, or even to damage, the source of AC voltage VAC.

In a converter of the type in FIG. 1, comprising diodes 132 and 142 or where diodes 132 and 142 are replaced with transistors, to avoid the current peak at the start, it could have been devised to provide for one of the couplings between diode bridge 120 (FIG. 1) and capacitive element 112 (FIG. 1) to comprise a resistor. To limit power losses in operation in the resistor, it could also have been devised to:

place an electromechanical relay in parallel with the resistor to short-circuit it once the charge is finished; and/or provide for the resistor to have a value which decreases according to the resistor temperature. As a comparison, an advantage of using thyristors 234 and 244 to obtain DC voltage VDC is that they are not conductive in the forward direction in the absence of a gate current. Thereby, thyristors 234 and 244 remain in the off state at the starting. It is thus avoided an electromechanical relay, which increases the reliability of the converter.

Figure 8:
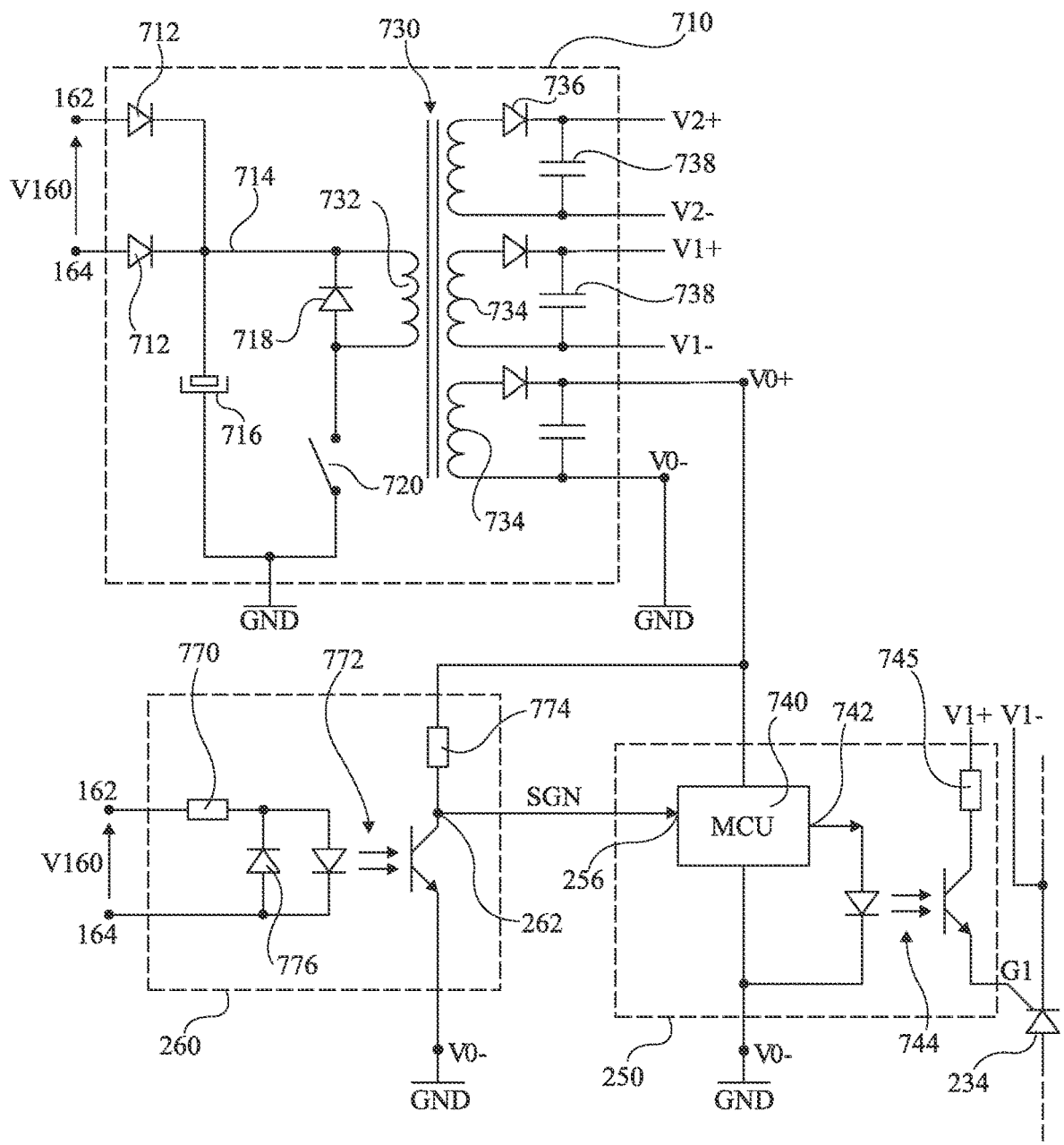
FIG. 8 schematically shows an embodiment of a converter control circuit, coupled to a thyristor of the converter.

FIG. 8 schematically shows an embodiment of circuits of a converter, coupled to a thyristor of the converter. More specifically, the shown circuits comprise control circuits 250 and detector 260 of the converters of FIGS. 2, 5, and 6, as well as a circuit 710 for delivering voltages V0, V1, and V2 between nodes, respectively V0+ and V0−, V1+ and V1−, V2+ and V2−, from the voltage between terminals 162 and 164 of capacitive element 160 (FIGS. 1, 2, 5, and 6). Voltage V0 is a power supply voltage common to detector 260 and to control circuit 250.

In the shown example, circuit 710 comprises two diodes 712 in anti-series between terminals 162 and 164. Diodes 712 have their cathodes coupled, preferably connected, to a node 714. Node 714 is coupled to node GND by a capacitor 716, preferably polar. In parallel with capacitor 716, between node 714 and node GND, circuit 710 comprises a diode 718 and a switch 720 electrically in series. Diode 718 has its cathode facing node 714. As an example, switch 720 is located, with respect to diode 718, on the side of node GND. As compared with the shown example, the directions of the diodes 712, 718 and of capacitor 716 may be exchanged.

Circuit 710 further comprises a transformer 730. Transformer 730 comprises a winding 732 connected in parallel with diode 718. For each of voltages V0, V1, and V2, transformer 730 comprises a winding 734. Each winding 734 of transformer 730 is in series with a diode 736 between the terminals of a capacitive element 738. Each diode 736 has, as an example, its anode facing winding 734. As an example, node V0− is coupled, preferably connected, to node GND.

In operation, switch 720 is alternately set to the on and off states at a switching frequency. The three voltages V0, V1, and V2 are thus obtained. In variations, the number of obtained voltages may be smaller or greater than three.

The shown example is not limiting, and circuit 760 may be formed by any circuit capable of supplying voltage V0 and, preferably, one or a plurality of other voltages such as voltages V1 and V2.

In the shown example, control circuit 250 preferably comprises a sequential data processing unit 740 (MCU). Unit 740 comprises a microprocessor and, preferably, a memory. Unit 740 is powered with voltage V0, that is, it is connected between nodes V0+ and V0−. An input of unit 740 forms the input 256 (FIG. 2) of control circuit 250. Control circuit 250 further comprises an optocoupler 744 having its control photodiode coupling an output 742 of unit 740 to node V0−. In the shown example, the optocoupler has a collector coupled, preferably via a resistor 745, to node V1+, and an emitter coupled, preferably connected, to gate G1 of thyristor 234. In this example, node V1− is coupled, preferably connected, to the cathode of thyristor 234. In another example where the thyristor is an anode-gate thyristor, node V1− may be coupled, preferably via a resistor, to the optocoupler to receive the gate current, and node V1+ may be coupled, preferably connected, to the anode of thyristor 234.

The optocoupler 744 thus arranged provides a current on gate G1 from voltage V1 when output 742 is set to a high level. Preferably, the control circuit further comprises another optocoupler, not shown, arranged similarly to optocoupler 744, to deliver a current on gate G2 from voltage V2 when another output, not shown, of unit 740 is set to a high level. Optocoupler 744 and this other optocoupler may be replaced with any device configured to deliver, from voltages V1 and/or V2, gate currents according to an output level of processing unit 740. Voltages V1 and/or V2 thus form thyristor control power supply voltages.

Data processing unit 740 preferably comprises a program having its execution by the microprocessor causing: the implementation of the detection of the absence of an AC voltage across capacitive element 160 from the signal SGN delivered by detector 260; and the application of the gate current(s) to thyristors 234 and 244 to discharge capacitive element 160, as described hereabove in relation with FIG. 4.

In operation, the gate current applied to thyristor 234 has the same value during discharge phases and to turn on the thyristors during halfwaves of AC voltage VAC. As compared with variations where the gate current is different for the discharge and to turn on the thyristor, it is avoided to provide additional components intended to generate a plurality of different gate current values. In other words, the same elements of the control circuit, such as output 742 and optocoupler 744, may be used to turn on the thyristor during halfwaves of the AC voltage and for the discharge of capacitive element 160. The fact of thus using same portions of the control circuit to discharge capacitive element 160 as for the conversion of the AC voltage thus enables to simplify the converter and to decrease the number of components.

In the shown example, detector 260 comprises, between terminals 162 and 164 of capacitive element 160, a resistive element 770 in series with a photodiode for controlling an optocoupler 772. The photodiode for controlling optocoupler 772 is, for example, on the side of terminal 164. For example, the cathode of the photodiode for controlling optocoupler 772 faces terminal 164. Optocoupler 772 has a collector coupled, preferably connected, to output 262 of detector 260. The collector of optocoupler 772 is further coupled to node V0+ by a resistive element 774. Optocoupler 772 has an emitter coupled, preferably connected, to node V0−. Optionally, a diode 776 electrically in antiparallel with the photodiode for controlling optocoupler 772 is provided.

This example is not limiting, and detector 260 may be formed by any device capable of delivering a digital signal from which the absence of an AC voltage can be deduced.

Various embodiments and variations have been described. It will be understood by those skilled in the art that certain features of these various embodiments and variations may be combined, and other variations will occur to those skilled in the art. In particular, although the above-described discharge circuits are provided to discharge capacitive elements of converters and/or of power factor correctors, the described embodiments of discharge circuits may be implemented to discharge any non-polar capacitive element, intended to receive a voltage having a sign which is likely to change. Preferably, a detector of the presence of a voltage to be discharged across the capacitive element causes the implementation of the discharge.

Finally, the practical implementation of the described embodiments and variations is within the abilities of those skilled in the art based on the functional indications given hereabove.

The invention claimed is:

1. A method for discharging a capacitive element having terminals coupled to a rectifying bridge including first and second thyristors that are electrically in antiparallel, the first thyristor having a control terminal and the second thyristor having a control terminal, the method comprising:
   determining which of the first and second thyristors is reverse-biased by a voltage stored across the terminals of the capacitive element;
   applying a gate current to the control terminal of the determined one of the first and second thyristors which is reverse-biased by the voltage stored across the terminals of the capacitive element;
   wherein the applied gate current to said determined one of the first and second thyristors which is reverse-biased causes a leaking which discharges the voltage stored across the terminals of the capacitive element.

2. The method of claim 1, further comprising simultaneously not applying a gate current to the control terminal of the other one of the first and second thyristors which is not reverse-biased by the voltage stored across the terminals of the capacitive element.

3. The method of claim 1, wherein applying the gate current comprises applying the gate current for a length of time sufficient to complete the discharge of the voltage stored across the terminals of the capacitive element.

4. The method of claim 1, wherein, for each thyristor of said first and second thyristors, a transistor switch and the thyristor are electrically in series between the terminals of the capacitive element.

5. The method of claim 1, wherein, for each thyristor of the said first and second thyristors, a diode and the thyristor are electrically in anti-series between the terminals of the capacitive element.

6. The method of claim 1, wherein an AC voltage is applied between the terminals of the capacitive element, and further comprising causing said discharge to occur in response to a detection that application of the AC voltage to the terminals of the capacitive element has terminated.

7. The method of claim 6, further comprising:
   detecting a sign of a voltage across the capacitive element; and
   wherein detection that application of the AC voltage has terminated comprises detecting that the sign does not change for a given duration; and
   wherein in response thereto application of the gate current is made so as to cause said discharge to occur.

8. The method of claim 6, further comprising, during a halfwave of the applied AC voltage, controlling one thyristor of said two thyristors which is forward-biased to be in an on state.

9. The method of claim 8, wherein controlling comprises applying a gate current to a control terminal of the forward-biased thyristor, wherein said gate current has a same value as the gate current applied to said reverse-biased during said discharge.

10. A circuit, comprising:
    a rectifying bridge including first and second thyristors that are electrically in antiparallel and coupled to a capacitive element, the first thyristor having a control terminal and the second thyristor having a control terminal; and
    a control circuit configured to:
    determine which of the first and second thyristors is reverse-biased by a voltage stored across the terminals of the capacitive element; and
    apply a gate current to the control terminal of the determined one of the first and second thyristors which is reverse-biased by the voltage stored across the terminals of the capacitive element;
    wherein the applied gate current to said determined one of the first and second thyristors which is reverse-biased causes a leaking which discharges the voltage stored across the terminals of the capacitive element.

11. The circuit of claim 10, wherein the control circuit is further configured to simultaneously not apply a gate current to the control terminal of the other one of the first and second thyristors which is not reverse-biased by the voltage stored across the terminals of the capacitive element.

12. The circuit of claim 10, wherein the control circuit is further configured to apply the gate current for a length of time sufficient to complete the discharge of the voltage stored across the terminals of the capacitive element.

13. The circuit of claim 10, wherein the control circuit comprises:
    a detection circuit configured to detect presence of a voltage to be discharged across the capacitive element; and
    wherein said control circuit responds to a detection signal output by the detection circuit by applying the gate current during said discharge.

14. The circuit of claim 13, wherein said detection circuit is configured to detect a sign of a voltage across the capacitive element, and wherein said control circuit is configured to detect the presence of the voltage to be discharged when said sign does not change for a given duration.

15. The circuit of claim 14, wherein a same portion of the control circuit is used to perform said setting to the on state and to apply the gate current during said discharge.

16. The circuit of claim 13, wherein the control circuit comprises a sequential data processing unit.

17. The circuit of claim 13, further comprising a voltage circuit configured to deliver, from a voltage across the capacitive element, a voltage common to said detection circuit and to the control circuit and further deliver one or a plurality of power supply voltages for controlling the two thyristors.

18. The circuit of claim 10, wherein the two thyristors are anode-gate thyristors.

19. The circuit of claim 10, wherein the two thyristors have opposite gate types.

20. The circuit of claim 10, wherein the two thyristors are cathode-gate thyristors.

21. A power factor corrector comprising the circuit of claim 10.

22. A converter comprising the circuit of claim 10.

23. A method for discharging a capacitive element having terminals coupled to first and second input terminals of a rectifying bridge circuit, wherein one of said first and second input terminals is a midpoint connection of first and second thyristors of said rectifying bridge circuit that are electrically series connected between first and second output terminals of said rectifying bridge circuit, said method comprising:
    determining which of the first and second thyristors of said rectifying bridge circuit is reverse-biased by a voltage stored across the terminals of the capacitive element; and
    applying a gate current to a control terminal of the determined one of the first and second thyristors which is reverse-biased by the voltage stored across the terminals of the capacitive element.

24. The method of claim 23, further comprising simultaneously not applying a gate current to the control terminal of the other one of the first and second thyristors of said rectifying bridge circuit which is not reverse-biased by the voltage stored across the terminals of the capacitive element.

25. The method of claim 23, wherein applying the gate current comprises applying the gate current for a length of time sufficient to complete the discharge of the voltage stored across the terminals of the capacitive element.

26. The method of claim 23, wherein an AC voltage is applied between the terminals of the capacitive element, and further comprising causing said discharge to occur in response to a detection of termination of application of the AC voltage.

27. The method of claim 26, further comprising:
    detecting a sign of a voltage across the capacitive element; and
    wherein detection that application of the AC voltage has terminated comprises detecting that the sign does not change for a given duration; and
    wherein in response thereto application of the gate current is made so as to cause said discharge to occur.

28. A circuit, comprising:
    a rectifying bridge circuit having first and second input terminals coupled to terminals of a capacitive element and first and second output terminals, wherein one of said first and second input terminals is a midpoint connection of first and second thyristors of said rectifying bridge circuit that are electrically series connected between the first and second output terminals of said rectifying bridge circuit;
    a control circuit configured to:
        determining which of the first and second thyristors of said rectifying bridge circuit is reverse-biased by a voltage stored across the terminals of the capacitive element; and
        applying a gate current to a control terminal of the determined one of the first and second thyristors which is reverse-biased by the voltage stored across the terminals of the capacitive element in order to discharge said capacitive element.

29. The circuit of claim 28, wherein the control circuit is further configured to simultaneously not apply a gate current to the control terminal of the other one of the first and second thyristors which is not reverse-biased by the voltage stored across the terminals of the capacitive element.

30. The circuit of claim 28, wherein the control circuit is further configured to apply the gate current for a length of time sufficient to complete the discharge of the voltage stored across the terminals of the capacitive element.

31. The circuit of claim 28, further comprising a detection circuit configured to detect a sign of a voltage across the capacitive element, and wherein said control circuit is configured to detect an absence of an AC voltage applied to said capacitive element when said sign does not change for a given duration.

* * * * *